US008478885B2

(12) United States Patent
Oka

(10) Patent No.: US 8,478,885 B2
(45) Date of Patent: Jul. 2, 2013

(54) IMAGE PHOTOGRAPHIC APPARATUS

(75) Inventor: Koji Oka, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 617 days.

(21) Appl. No.: 11/997,198

(22) PCT Filed: Jul. 31, 2006

(86) PCT No.: PCT/JP2006/315546
§ 371 (c)(1),
(2), (4) Date: Jan. 29, 2008

(87) PCT Pub. No.: WO2007/013700
PCT Pub. Date: Feb. 1, 2007

(65) Prior Publication Data
US 2010/0100628 A1    Apr. 22, 2010

(30) Foreign Application Priority Data

Jul. 29, 2005  (JP) ................................. 2005-219923
Jun. 1, 2006   (JP) ................................. 2006-153284

(51) Int. Cl.
*G06F 15/16*   (2006.01)
*G06F 15/177*  (2006.01)
*G06F 15/173*  (2006.01)

(52) U.S. Cl.
USPC ............ 709/228; 709/217; 709/220; 709/226

(58) Field of Classification Search
USPC ....................................................... 709/228
See application file for complete search history.

(56) References Cited

U.S. PATENT DOCUMENTS

| 5,014,267 A  | * | 5/1991  | Tompkins et al. | ............ 370/259 |
| 7,069,436 B1 |   | 6/2006  | Akachi          |                      |
| 7,127,745 B1 | * | 10/2006 | Herse et al.    | ...................... 726/30 |
| 7,165,224 B2 | * | 1/2007  | Pyhalammi       | ................... 715/748 |

(Continued)

FOREIGN PATENT DOCUMENTS

| EP | 1 517 480 A1 | 3/2005 |
| JP | 9-322249     | 12/1997 |

(Continued)

OTHER PUBLICATIONS

Office Action issued Jul. 12, 2011 in Japanese Patent Application No. 2006-153284.

(Continued)

*Primary Examiner* — Richard G Keehn
(74) *Attorney, Agent, or Firm* — Oblon, Spivak, McClelland, Maier & Neustadt, L.L.P.

(57) ABSTRACT

An image photographic apparatus which includes an information recording medium capable of communicating by use of a communication protocol and recording an image of a subject, and is configured to function as a server to transmit the image of the subject stored in the information recording medium to a client connected to a network by establishing communication based on a request for communication start from the client, the image photographic apparatus including a detection device to detect the request for communication start from the client, a display unit to display other client who transmits a request for communication start based on detection results of the detection device, and a selection-input device to select and input whether allowing communication to the other client transmitting the request for communication start based on the display of the display unit.

5 Claims, 14 Drawing Sheets

U.S. PATENT DOCUMENTS

| | | | |
|---|---|---|---|
| 7,668,939 B2 * | 2/2010 | Encarnacion et al. | 709/220 |
| 2003/0041326 A1 * | 2/2003 | Novak et al. | 725/25 |
| 2004/0119814 A1 * | 6/2004 | Clisham et al. | 348/14.08 |
| 2004/0125214 A1 * | 7/2004 | Oka et al. | 348/211.3 |
| 2005/0012828 A1 | 1/2005 | Oka | |
| 2005/0050576 A1 * | 3/2005 | Upendran et al. | 725/110 |
| 2005/0152287 A1 * | 7/2005 | Yokomitsu et al. | 370/255 |
| 2005/0233742 A1 * | 10/2005 | Karaoguz et al. | 455/432.3 |
| 2005/0268137 A1 * | 12/2005 | Pettey | 713/400 |
| 2006/0036847 A1 * | 2/2006 | Bush et al. | 713/153 |
| 2006/0089987 A1 * | 4/2006 | Igarashi et al. | 709/225 |
| 2006/0212407 A1 * | 9/2006 | Lyon | 705/71 |
| 2006/0224688 A1 * | 10/2006 | Morris | 709/217 |

FOREIGN PATENT DOCUMENTS

| | | |
|---|---|---|
| JP | 2002-84359 | 3/2002 |
| JP | 2003-204506 | 7/2003 |
| JP | 2004-080256 | 3/2004 |
| JP | 2004 120708 | 4/2004 |
| JP | 2004 159281 | 6/2004 |
| JP | 2004-173148 | 6/2004 |
| JP | 2005 151470 | 6/2005 |
| JP | 2005 151521 | 6/2005 |
| JP | 2005 184463 | 7/2005 |
| JP | 2005 215495 | 8/2005 |
| JP | 2006 81049 | 3/2006 |
| JP | 3833238 | 7/2006 |
| JP | 2006 238145 | 9/2006 |
| JP | 2006 245687 | 9/2006 |
| JP | 2006 277720 | 10/2006 |
| JP | 2007 36979 | 2/2007 |
| JP | 2007 60631 | 3/2007 |
| KR | 2001-0093241 | 10/2001 |
| WO | WO 99/48276 | 9/1999 |

OTHER PUBLICATIONS

Japanese Office Action mailed Dec. 6, 2011, in Patent Application No. 2006-153284.

* cited by examiner

FIG.5A

| | |
|---|---|
| Command ID: Request for Communication Start ("start-req") | 0 |
| Type of Terminal: Personal Computer ("PC") | 1 |
| Name of Terminal: Personal Computer A ("PC-A") | 2 |
| | 3 |

FIG.5B

| | |
|---|---|
| Command ID: Response to Communication Start ("start-rsp") | 0 |
| Type of Terminal: Digital Camera ("DC") | 1 |
| Name of Terminal: Camera A ("camera-A") | 2 |
| | 3 |

FIG.5C

| | |
|---|---|
| Command ID: Refusal to Communication Start ("start-NG") | 0 |
| Type of Terminal: Digital Camera ("DC") | 1 |
| Name of Terminal: Camera A ("camera-A") | 2 |
| Reason: During Communication with Other Terminal ("busy") | 3 |

FIG.5D

| | |
|---|---|
| Command ID: Request for Communication Start ("start-req") | 0 |
| Type of Terminal: Absence ("") | 1 |
| Name of Terminal: Absence ("") | 2 |
| | 3 |

FIG.5E

| | |
|---|---|
| Command ID: Request for Password ("pass-req") | 0 |
| Type of Terminal: Digital Camera ("DC") | 1 |
| Name of Terminal: Camera A ("camera-A") | 2 |
| | 3 |

FIG.5F

| | |
|---|---|
| Command ID: Response to Password ("pass-rsp") | 0 |
| Type of Terminal: Personal Computer ("PC") | 1 |
| Name of Terminal: Personal Computer A ("PC-A") | 2 |
| Password : "abcdef00" | 3 |

FIG.5G

| | |
|---|---|
| Command ID: Notice of Communication completion ("end-ind") | 0 |
| Type of Terminal: Digital Camera ("DC") | 1 |
| Name of Terminal: Camera A ("camera-A") | 2 |
| | 3 |

FIG.5H

| | |
|---|---|
| Command ID: Request for Communication completion ("end-req") | 0 |
| Type of Terminal: Personal Computer ("PC") | 1 |
| Name of Terminal: Personal Computer A ("PC-A") | 2 |
| | 3 |

FIG.5I

| | |
|---|---|
| Command ID: Response to Communication completion ("end-rep") | 0 |
| Type of Terminal: Personal Computer ("PC") | 1 |
| Name of Terminal: Personal Computer A ("PC-A") | 2 |
| | 3 |

FIG.10
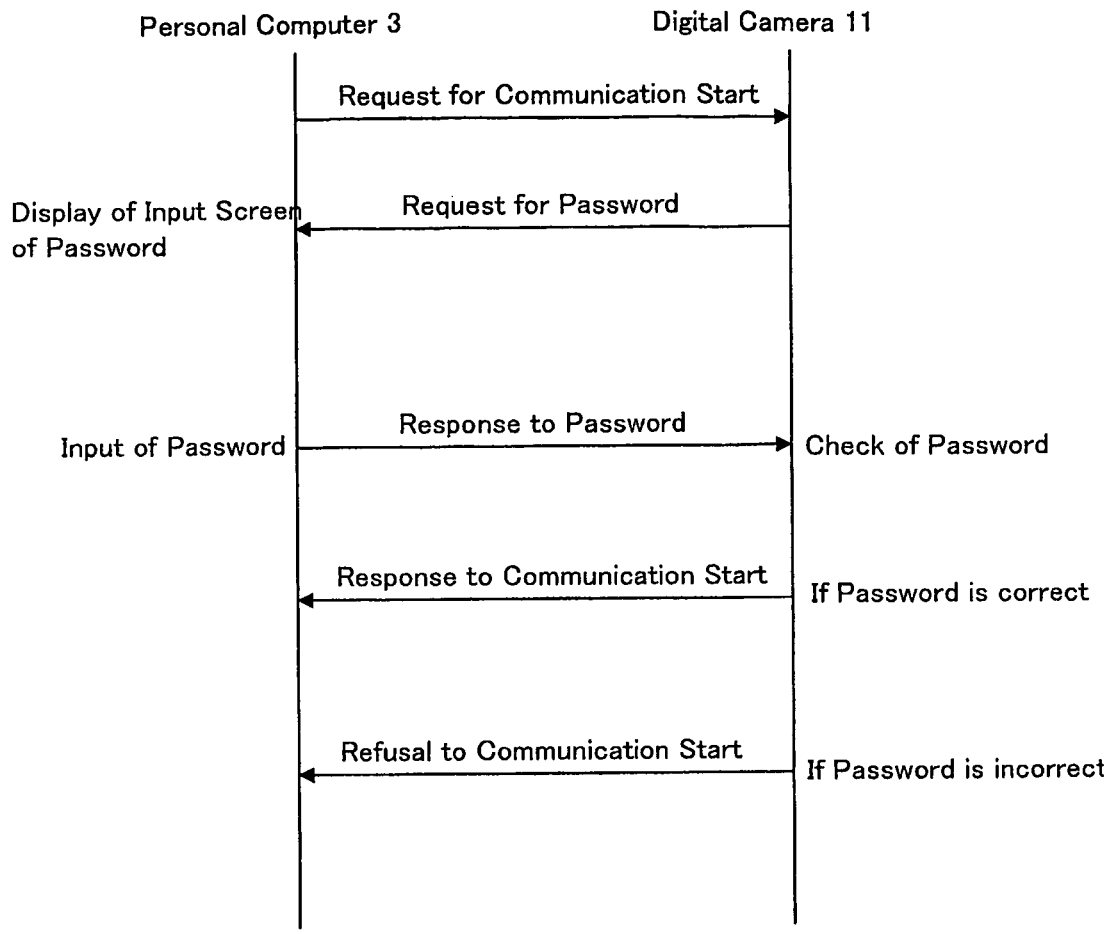
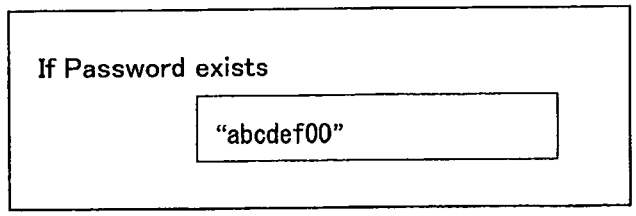
FIG.11A
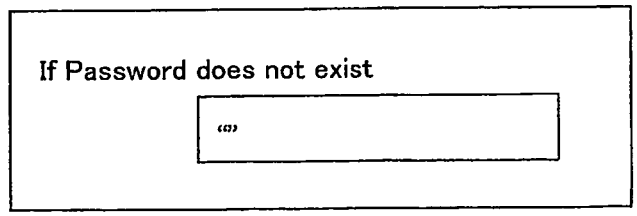
FIG.11B

IMAGE PHOTOGRAPHIC APPARATUS

CROSS-REFERENCE TO THE RELATED APPLICATIONS

This application is based on and claims the priority benefit of each of Japanese Patent Application No. 2005-219923, filed on Jul. 29, 2005, and Japanese Patent Application No. 2006-153284, filed on Jun. 1, 2006, the contents of which are incorporated herein by reference.

TECHNICAL FIELD

The present invention relates to an image photographic apparatus to transmit an image of a subject to a client who is other party of communication.

BACKGROUND ART

Conventionally known is an image photographic apparatus or digital camera having a structure configured to transfer an image of a subject to a printer connected to a local area network and print out the image by the printer (for reference, see Japanese Patent Laid-Open 2004-159281).

There is also known a digital camera corresponding to a PTPIP protocol. The digital camera corresponding to the PTPIP protocol is, when receiving a request for communication start from a personal computer as a client, configured to establish a communication in response to the request and perform the transfer of the image of the subject automatically.

Meanwhile, assuming that a communication between a digital camera 2 as a server and a personal computer 3 as a client is performed under the local area network 1, as shown FIG. 1, a large number of personal computers 3 and a large number of digital cameras 2 exist in the local area network 1.

Under the circumstances, when a request for communication start is transmitted from one personal computer 3 to one or more digital cameras 2, if any security measures are not provided, there is a problem that an image(s) of a subject in each of the digital cameras can be acquired from any personal computer.

DISCLOSURE OF INVENTION

An object of the present invention is to provide an image photographic apparatus capable of accomplishing security for an image of a subject in a digital camera under a local area network securely and in a simple structure.

To accomplish the above-mentioned object, an image photographic apparatus according to one embodiment of the present invention includes an information recording medium capable of communicating by use of a communication protocol and recording an image of a subject, and is configured to function as a server to transmit the image of the subject stored in the information recording medium to a client connected to the Network by establishing a communication based on a request for communication start from the client.

The image photographic apparatus includes a detection device to detect the request for communication start from the client, a display unit to display other party client who transmits a request for communication start based on detection results of the detection device, a selection-input device to select and input about whether to allow communication to the other party client transmitting the request for communication start based on the display of the display unit.

BRIEF DESCRIPTION OF DRAWINGS

FIG. 5 is a view showing one example of a structure of packet data used for communication of an image photographic apparatus according to the present invention, in which FIG. 5A is one example of the packet data of a request ID for communication start, FIG. 5B one example of packet data of a response ID to communication start, FIG. 5C one example of packet data of a refusal ID for communication start, FIG. 5D another example of the packet data of a request ID for communication start, FIG. 5E one example of packet data of a request command ID for password, FIG. 5F one example of packet data of a responsive command ID to password, FIG. 5G one example of packet data of a notice command ID for communication completion, FIG. 5H one example of packet data of a request command ID for communication completion, FIG. 5I one example of packet data of a responsive command ID to communication completion.

FIG. 10 is a flow chart showing the procedure of process of the password of the image photographic apparatus according to the present invention, in which a state where the password is input at a PC side is shown.

FIG. 11 is a view showing one example of password data recorded in a flash ROM to perform determination of presence and absence of the password, in which FIG. 11A shows one example of data of the presence of the password, and FIG. 11B one example of data of the absence of the password.

BEST MODE FOR CARRYING OUT THE INVENTION

Preferred embodiments of the present invention will be explained in detail with reference to the accompanying drawings below.

Figure 1:
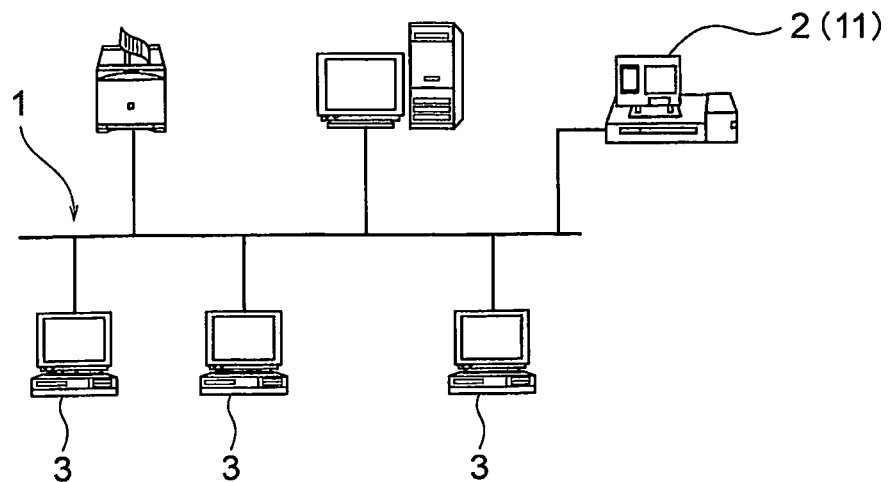
FIG. 1 is view showing one example of a local area network.
Figure 2:
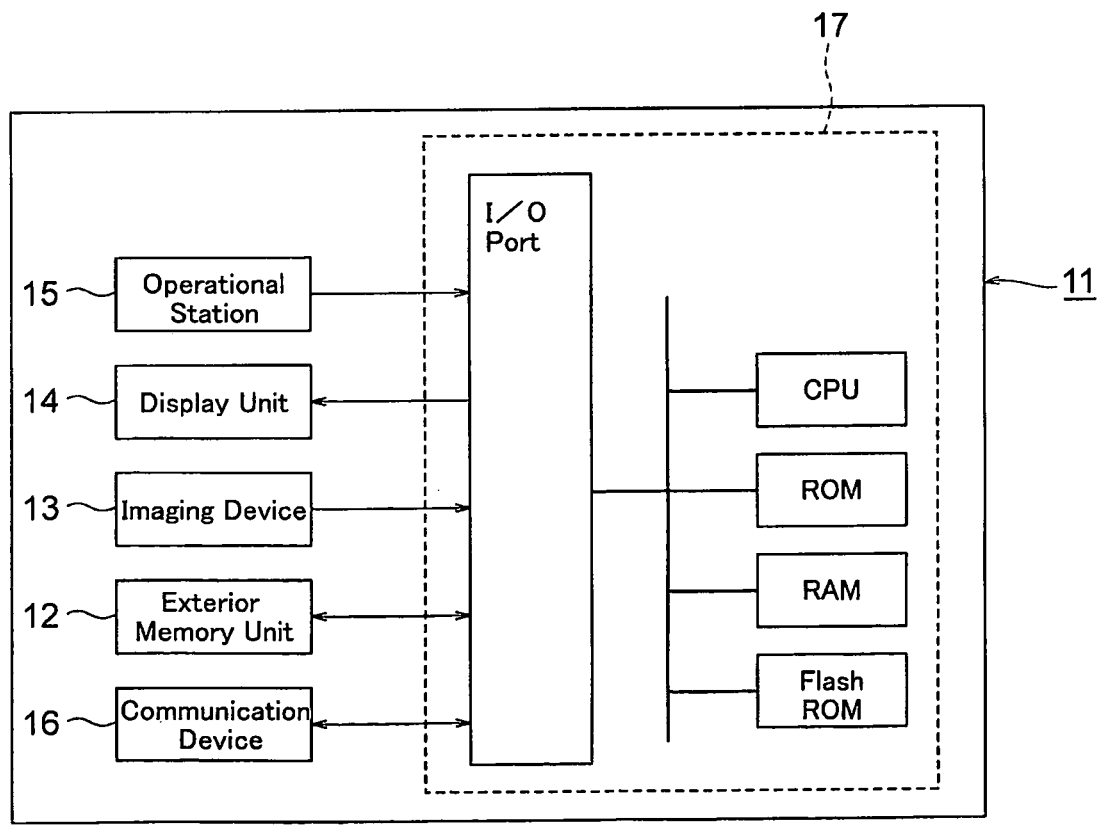
FIG. 2 is a view showing a circuit of a digital camera according to the present invention.

FIG. 2 illustrates a first embodiment of a digital camera to which an image photographic apparatus according to the present invention is applied.

The digital camera 11 includes an exterior memory unit 12 as an information memory medium such as a flash memory or the like, an imaging device 13 having a CCD/AD converter or the like, a display unit 14 to display various kinds of information, an operational station 15 configured to perform input operation from the exterior, a communication device 16 connected to a local area network 1, and a control device 17 configured to control the entire digital camera 11.

The control device 17 is structured by a conventional micro-computer which includes a CPU, a ROM, a RAM, a flash ROM, an inputting and outputting port and a bus line combining among them. The exterior memory unit 12 is configured to store an image of a subject.

The digital camera 11 is capable of communicating by use of a communication protocol and of sending the subject image stored in the information memory medium to a personal computer 3 by establishing communication based on a request for communication start from the personal computer 3 as a client connected to the local area network 1.

Meanwhile, an IP address is assigned to the digital camera 11 when the digital camera is connected to the local area network 1. The IP address is an identity signal assigned to each of computers or communication instruments which are connected to the IP net work such as the Internet, Intranet or the like. The IP address is structured by 16 hexadecimal numbers of 4 bits at the present time The IP address is divided into a network section and a host section. The network section is an address to designate the network and the host section is an address to designate devices in the network.

The communication device 16 has a detection device which detects the request for communication start from the personal computer 3. The display unit 14 acts to display a personal computer 3 of other party who transmits the request for communication start based on detection results of the detection device.

The detection device is configured to draw-out an IP address included in the request for communication start from the request or MAC-address from the Ethernet (registered trade mark), when receiving the request for communication start from the personal computer 3. The Mac address is an identification number addressed to an inherent instrument and structured by 16 hexadecimal numbers of 6 bites. The detection device is capable to be of obtaining a name of the personal computer 3 referring to data of a name server in which correspondence of the drawn-out IP address or Mac address is described.

Figure 3:
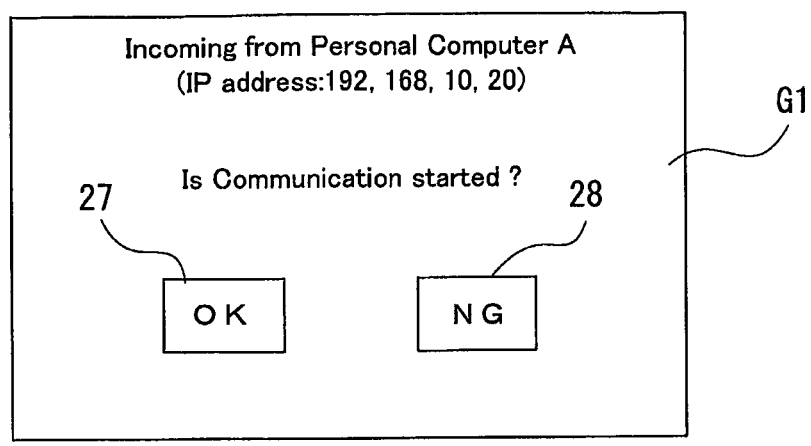
FIG. 3 is view showing one example of a selection input screen displayed on a display unit shown in FIG. 2.

A name or IP address of the personal computer 3 of the other party who transmits the request for communication start, in addition, an allowance button 27 to allow the request for communication start of the personal computer 3 and a refusal button 28 to refuse the request for communication start of the personal computer 3 are displayed on the display unit 14, as shown in FIG. 3. Here, the allowance button 27 and the refusal button 28 function as selection-input devices.

Meanwhile, in FIG. 3, character A shows a name of the personal computer 3.

Figure 4:
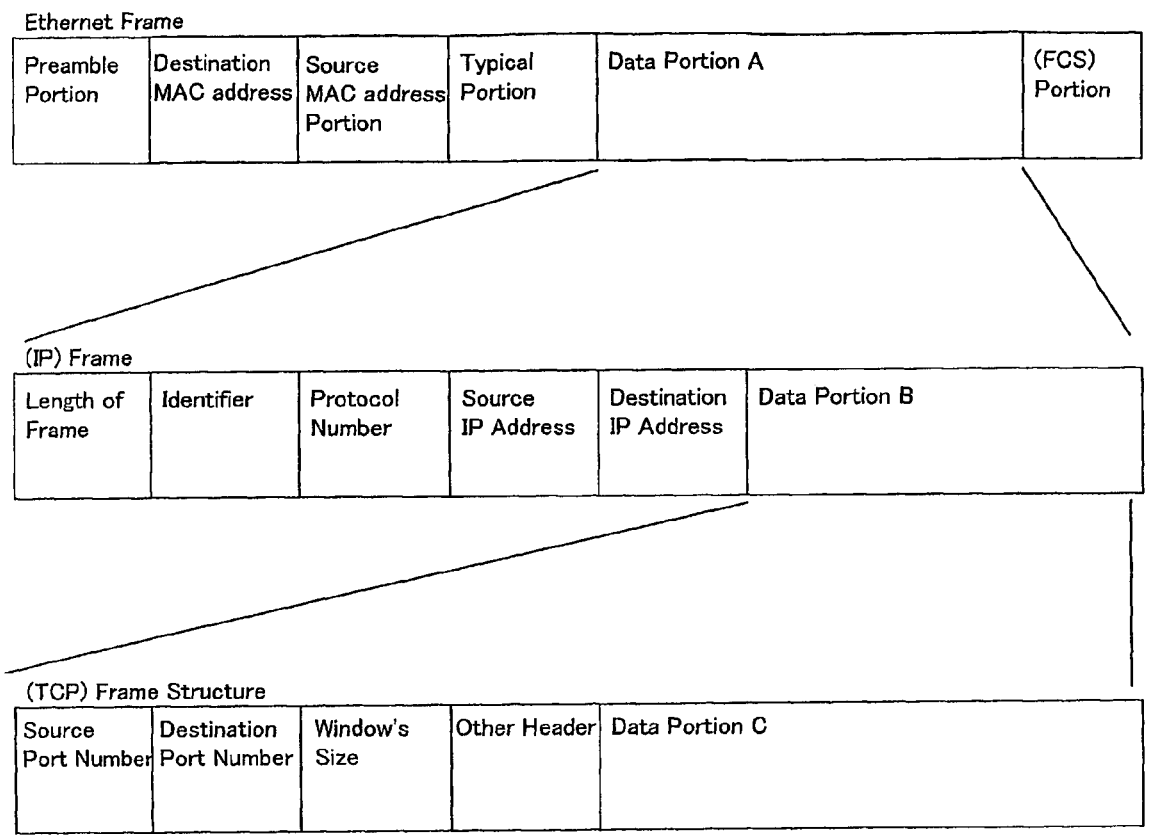
FIG. 4 is an explanatory view showing one example of a structure of a data frame according to the present invention.

One example of a structure a data frame used for the image photographic apparatus according to the present invention is shown in FIG. 4.

A structure of the data frame is determined every layers of the communication. The data frame includes a frame of the lowermost layer which is the Ethernet (registered Trade Mark), an IP frame or data part A and a TCP frame or data part B. The frame of the Ethernet includes, for example, a preamble portion, a destination MAC address portion, a source MAC address portion, a type portion, a data portion A and an FCS portion. In the frame of the lowermost layer of the Ethernet, all the data can be seen.

The data portion A or IP frame is framed and packeted in the Ethernet frame, and structures an upper layer. Here, the IP frame includes, for example, a frame length, an identifier, a protocol number, a source IP address, a destination IP address and a data portion B. The data portion B or TCP frame structures an upper layer of the IP frame. The TCP frame includes, for example, a source port number, a destination port number, a window size, other header and a data portion C.

Data as shown in FIGS. 5A to C are installed in portions corresponding to the data portion C of the TCP frame. In other words, the data according to the present invention are installed in an upper communication layer of the TCP.

FIG. 5A illustrates a structural example of a packet of the request for communication start as a command ID. FIG. 5B illustrates a structural example of a packet of a response to communication start as a command ID. FIG. 5C illustrates a structural example of a packet of a refusal to communication start as a command ID.

Here, information such as a type of terminal, a name of terminal, or the like about a transmission terminal that transmits a request for communication start is installed in a frame of the command ID of the request for communication start, as shown in FIG. 5A. In this case, it is possible to acquire a name of the other party who is the destination of the subject image only by receiving the request for communication start without requiring the name server. Consequently, words "personal computer A" which show the name of the other party who is the destination are displayed on a screen G1 of the display unit 14.

Meanwhile, information such as a type of terminal, a name of terminal, other transmission terminal or the like may not be installed in a frame of the command ID of the request for communication start, as shown in FIG. 5D. In this case, by acquiring the name of the other party through the name server or the like, the characters of the name of the other party are displayed on the screen G1 of the display unit 14. If the name cannot be acquired for the reason that there is no name server, an IP address may be displayed.

Moreover, information such as a type of terminal, a name of terminal, or the like about a transmission terminal that transmits a response to communication start is installed in a frame of the responsive command ID to communication start, as shown in FIG. 5B. In this case, it is possible to acquire a name of the other party that is the source of the subject image only by incoming the response to communication start without requiring the name server. Accordingly, the words "camera-A" showing the name of the other party that is the source are displayed on a screen of a display unit of the personal computer A that is the destination.

Furthermore, information such as a type of terminal, a name of terminal, or the like about a transmission terminal that transmits a refusal to communication start is installed in a frame of the refusal command ID to communication start, as shown in FIG. 5C. In this case, it is possible to acquire a name of the other party that is the source of the subject image only by incoming the refusal to communication start without requiring the name server.

Consequently, the words "camera-A" showing the name of the other party that is the source and the words "during communication with other terminal" showing the refusal reason are displayed on a screen of the display unit of the personal computer A that is the destination.

Figure 6:
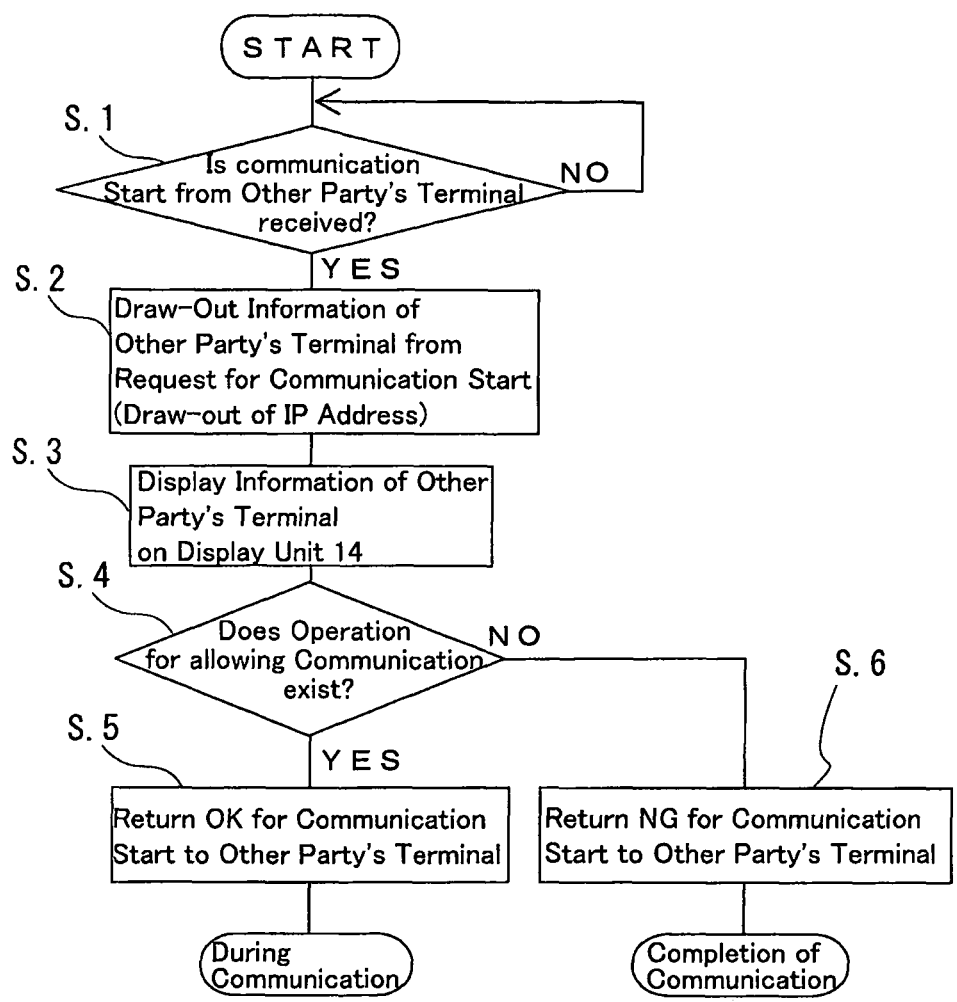
FIG. 6 is a flow chart for explaining operation of the image photographic apparatus according to a first embodiment of the present invention.

FIG. 6 illustrates a flow chart for explaining operation of the digital camera 11 according to the first embodiment of the present invention. The digital camera 11 is configured to monitor periodically whether the request for communication start exists in a state where a through image is displayed in a photographic mode or a reproduction image is displayed in a reproduced mode (S1).

When incoming the request for communication start from the personal computer 3, the detection device draws out the IP address of the personal computer 3 which is the transmission source included in the packet of the request for communication start (S2). The CPU allows the information of the name and so on of the personal computer 3 to display on the selection input screen G1 of the display unit 14 (S3). Predetermined items are displayed on the selection input screen G1 based on the packet of the request for communication start as shown in FIG. 5A.

Switching to the selection input screen G1 is accomplished automatically. More specifically, when the digital camera 11 receives the request for communication start while executing the operation from the exposure to the recording in the photographic mode of the digital camera, the display unit 14 is switched from the state where the through image or reproduction image is displayed to the selection input screen G1 after the photographic operation is completed.

The digital camera 11 is configured to standby until either the allowance button 27 or the refusal button 28 is operated (S4). If the allowance button 27 is operated, the above-identified responsive packet to communication start as shown in FIG. 5B is transmitted to the personal computer 3 (S5).

Figure 7:
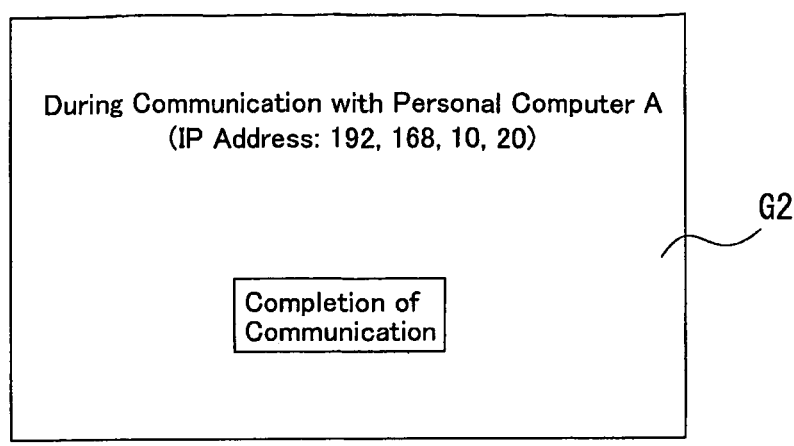
FIG. 7 is a view showing one example of a screen of communication displayed on the display unit shown in FIG. 2.

Thereby, communication is established between the personal computer 3 and the digital camera 11, thereby, the subject image is transmitted from the digital camera 11 to the personal computer 3. At this time, the display unit 14 is in a state of a screen G2 during the communication, as shown in FIG. 7. Meanwhile, during the communication, the display unit 14 is adapted to be in a blackout display. In addition, an LED (light emitting diode) may be flashed or the personal computer 3 of the other party may be structured to be maintained in a displayed state.

It is possible to accomplish effective utilization of a common memory by adopting a structure prohibiting a photographic operation during the execution of the above-mentioned communication mode. In addition, if remote photography is requested from the other party, it is possible to structure so as to execute the photography only when receiving the photographic request from the personal computer 3 by prohibiting the operation by the digital camera 11. It is also possible to structure so as to refuse a request for communication start from other terminal, or a personal computer 3 or printer during the execution of the communication mode.

In FIG. 3, when the refusal button 28 is operated, the digital camera 11 is configured to return the communication refusal packet shown in FIG. 5C to the personal computer 3 which transmits a request for communication start to refuse the communication between the digital camera 11 and the personal computer 3 (S6).

Meanwhile, the detection device may be structured to allows, when receiving a request for communication start from the personal computer 3, the personal computer 3 of the other party transmitting the request for communication start to display on the display unit 14 and display the password inputting screen G3 allowing the request for communication start of the personal computer 3 on the display unit.

The password is preferably stored in a non-volatile memory, for example, flash ROM (see FIG. 2) in the digital camera.

Figure 9:
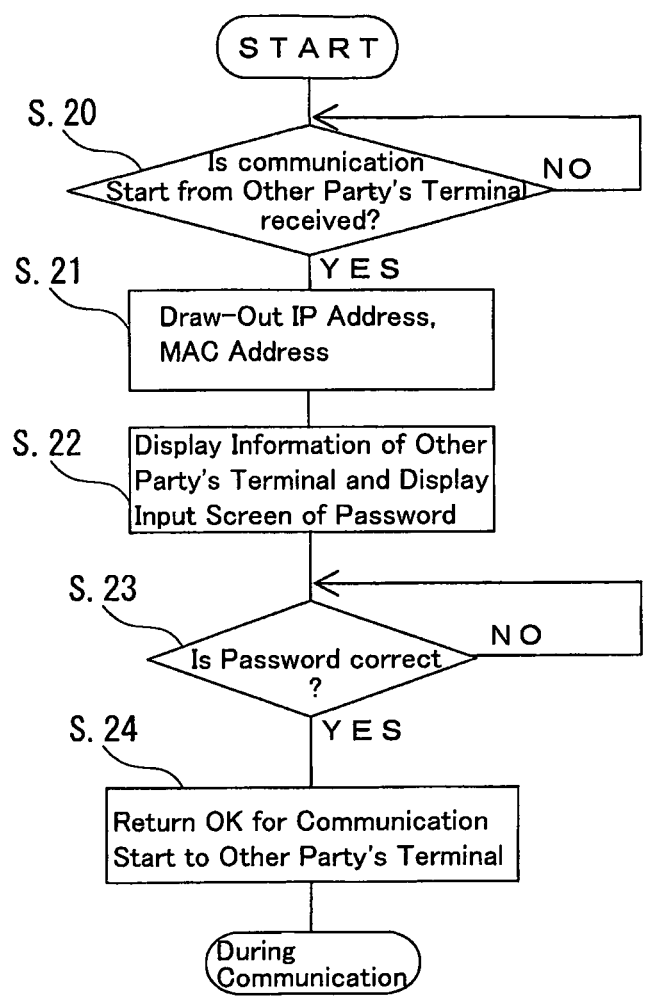
FIG. 9 is a flow chart showing a procedure of process of the password of the image photographic apparatus according to the present invention, in which a state where the password is input at a camera side is shown.

Next, procedure inputting the password in the digital camera is described referring to a flow chart shown in FIG. 9.

Figure 8:
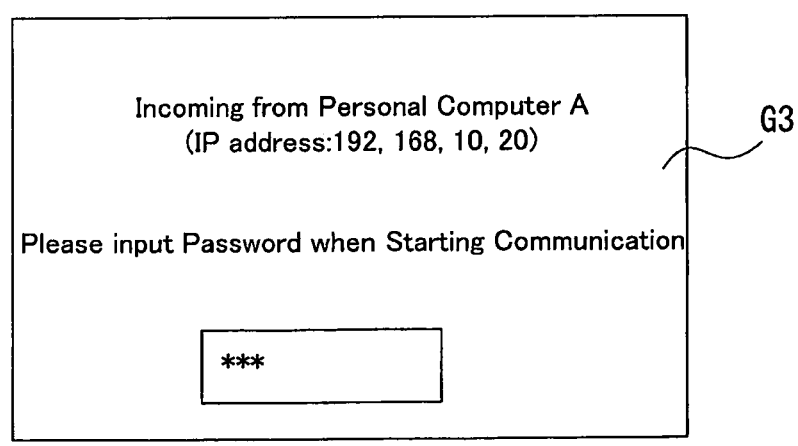
FIG. 8 is a view showing one example of a screen to input a password displayed on the display unit shown in FIG. 2.

When the detection device receives a request for communication start from the personal computer 3 (S20), it draws out an IP address included in the request for communication start or Mac address in the Ethernet (S21). The detection device allows a name or IP address of the personal computer 3 of the other party who transmits the request for communication start to display on the display unit 14 and display the password inputting screen G3 on the display unit as shown in FIG. 8 (S22).

A user inputs a password by the password inputting screen G3. When the password is input, a check about whether the input password corresponds to the password stored in the flash ROM is executed (S23). If the input password corresponds to the password stored in the flash ROM, the input password is determined as input by a correct user, the detection device returns the responsive packet to the communication start as shown in FIG. 5B to the personal computer 3 (S24).

Although the procedure inputting the password in the digital camera side in FIG. 9 has been described, it is possible to input the password in the personal computer side (hereinafter, referred to as PC side).

FIG. 10 illustrates a sequence inputting a password in the PC side. The digital camera 11 transmits, when receiving a request for communication start from the personal computer 3, a request for password to the personal computer 3.

FIG. 5E illustrates a structural example of a packet of a request command ID for password transmitted from the digital camera 11 to the PC side. Information such as a type of a terminal, a name of the terminal, or the like about a transmission terminal of a password requesting source are installed in the packet of the request command ID for password.

The personal computer 3 allows, when receiving a request command for password, a password inputting screen which has the same structure as the password inputting screen G3 shown in FIG. 8 to display on a monitor of the personal computer.

The personal computer 3 is, when the password is input, configured to transmit a password response to the input password to the digital camera 11.

FIG. 5F illustrates a structural example of a packet of a responsive command ID to password.

A type of a terminal, a name of the terminal, information of other transmission terminal in a password responsive source and so on are installed in the packet of the responsive command ID to password.

The digital camera 11 checks, when receiving a response to password from the personal computer 3, whether the received password corresponds to the password stored in the flash ROM. If the input password corresponds to the password stored in the flash ROM, the digital camera 11 determines the received password as input by a correct user and returns the responsive packet to communication start to the personal computer 3. If the received password does not correspond to the password stored in the flash ROM, the received password is determined that it is not input by a correct user, the digital camera 11 transmits the refusal responsive packet to communication start to the personal computer 3 to notice non-recognition of communication.

Meanwhile, a password setting area is provided in the flash ROM. When a value other than 0 (zero) is input in the password setting area as shown in FIG. 11A, the password setting is determined to be in "presence", when the value of 0 (zero) is input in the password setting area, the password setting is determined to be in "absence". Here, a non-volatile memory is preferably used for the flash ROM so that a stored content in the non-volatile memory is not lost even if a power source is turned OFF. The writing of the password in the flash ROM is executed by a known method, the setting of the password may be input by, for example, an operational table 15, and a password setting packet may be transmitted from the personal computer to the digital camera. Also, an operational method for setting and changing the password is a general method such as input of an old password, input of a new password or the like, a description thereof is omitted.

Of the communication protocols, there is a protocol capable of performing a plurality of communications simultaneously. If such a protocol is used, it is possible to communicate with a plurality of other party's terminals when receiving a request for communication start from each of other personal computers or printers, during the execution of the communication mode.

The number of terminal capable of communicating is decided based on imitation of a resource of the ROM, RAM or the like of the digital camera 11 side.

The image photographic apparatus may be configured to release the communication mode when receiving a request for communication completion from the personal computer 3 of the other party, or return to the photographic mode or reproduction mode which is an operational mode right before executing the communication mode. Furthermore, it is possible to adopt a structure to terminate the communication forcibly by turning-off the power source of the digital camera 11.

Figure 12:
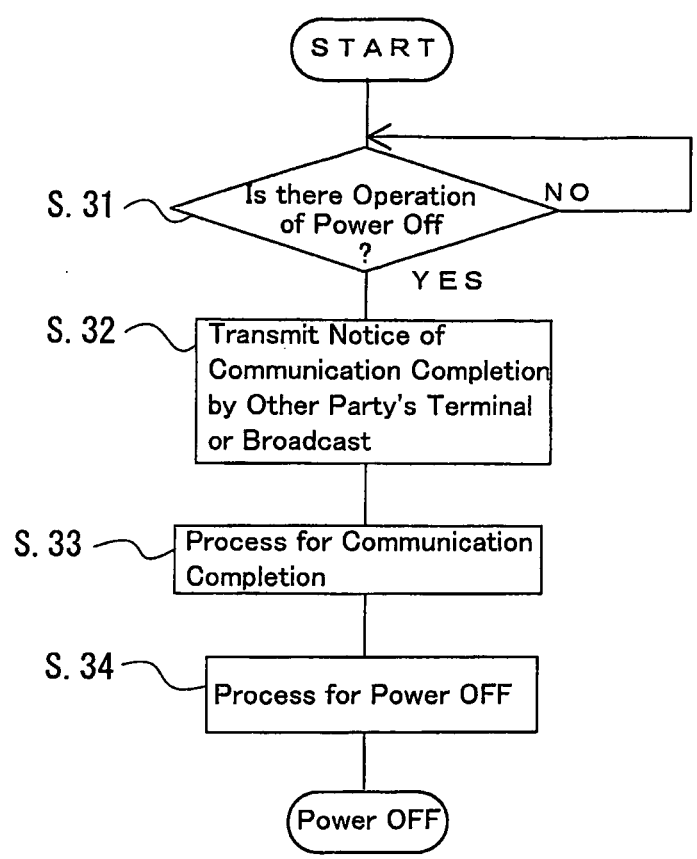
FIG. 12 is a flow chart showing a procedure of process of communication completion of the image photographic apparatus according to the first embodiment of the present invention, in which a state where a power source is turned off at a camera side forcibly to complete the communication is shown.

FIG. 12 illustrates a flow chart for explaining a process for communication completion when the power source of the digital camera is turned off.

When operation to turn-off the power source of the digital camera is executed (S31), the digital camera 11 transmits a packet of a notice command ID for communication completion to the third party (S32).

A type of a terminal to destination, and a name of the terminal are installed in the packet of the notice command ID for communication completion. In this example, although the packet of the notice command ID for communication completion as shown in FIG. 5G is configured to be transmitted to the terminal of the third party, a structure configured to transmit the packet to the entire terminals and notify the terminals of the packet by use of a broad cast can be adopted.

Next, the digital camera 11 is configured to execute a completion process of the power source such as socket close of communication (S33) and an off process (S34) of the power source to turn off the power source. If the digital camera by switching of the communication mode is shifted to a photographic process without the power source being turned off, the processes until the communication completion in the process S33 as shown in FIG. 12 are executed, then a mode switching process instead of the power source-off process may be executed.

Although the procedure to terminate the communication in the camera side in FIG. 12 has been described, it is also possible to terminate the communication in the PC side.

Figure 13:
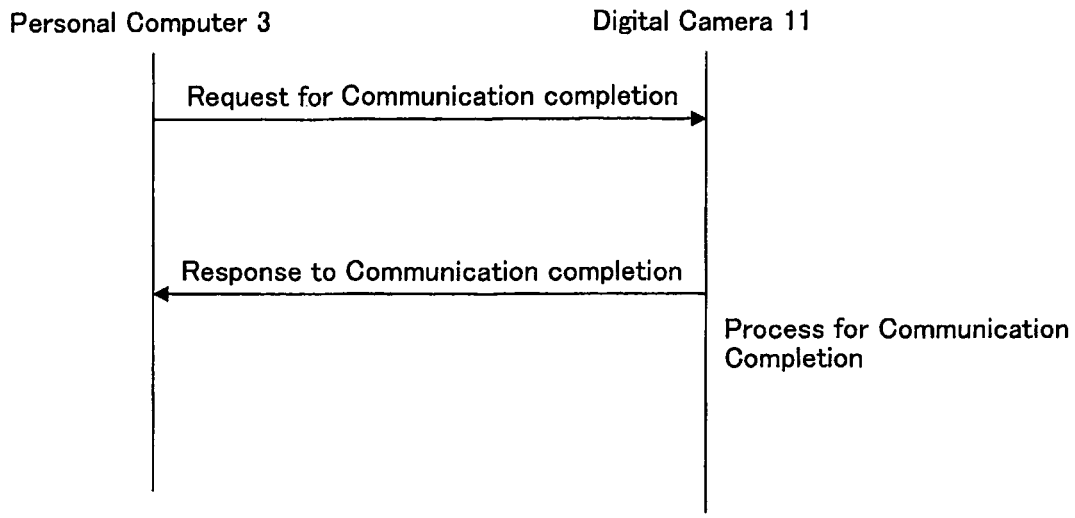
FIG. 13 is a flow chart showing the procedure of process of communication completion of the image photographic apparatus according to the first embodiment of the present invention, in which a state where the communication is completed at a PC side is shown.

FIG. 13 illustrates a sequence to terminate the communication in the PC side. The personal computer 3 transmits the packet of the demand ID for the communication completion as shown in FIG. 5H to the digital camera.

When the digital camera receives the packet of the demand ID for the communication completion which has been sent from the personal computer and is shown in FIG. 5H, the digital camera transmits a packet of responsive ID to the communication completion as shown in FIG. 5I to the personal computer and terminates the communication. In this case, the packet of responsive ID to the communication completion may be configured to notice the entire terminals of it by use of a broad cast.

Next, a second embodiment of the image photographic apparatus according to the present invention is described.

Figure 14:
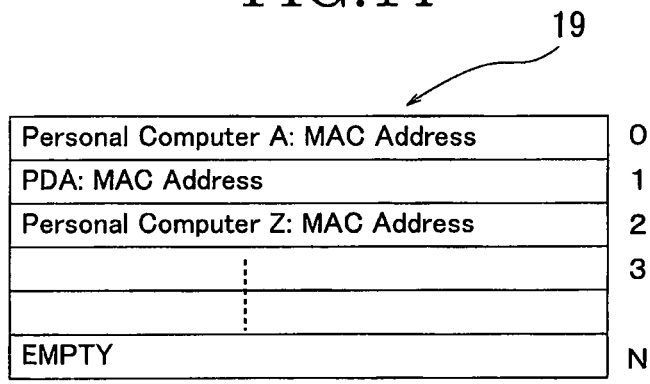
FIG. 14 is a view showing one example of a table of an image photographic apparatus according to a second embodiment of the present invention.

A table 19 to register a Mac address of the personal computer 3 or printer as a client is provided in the digital camera 11, as shown in FIG. 14. A setting area of the table 19 is provided in the flash ROM. A non-volatile memory is preferably used for the flash ROM so that a stored content in the non-volatile memory is not lost even if a power source is turned OFF.

Figure 15:
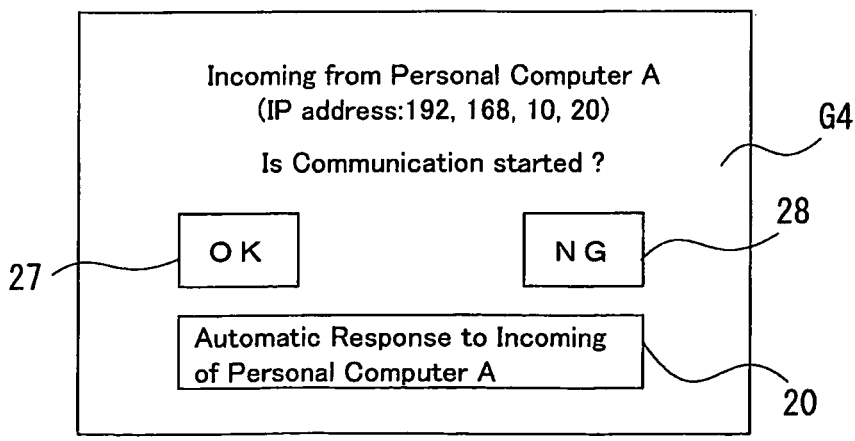
FIG. 15 is an explanatory view showing the image photographic apparatus according the second embodiment of the present invention, in which one example of an incoming screen of communication displayed on the display unit shown in FIG. 2.

A selection input screen G4 is displayed on the display unit 14, as shown in FIG. 15. An automatic responsive button 20 to automatically respond to a request for communication start is displayed on the selection input screen G4. When a user operates the automatic responsive button 20, a Mac address of a client is registered in the table 19. Thereafter, the digital camera 11 automatically responds to a request for communication start from a terminal which has the Mac address registered in the table 19.

Figure 16:
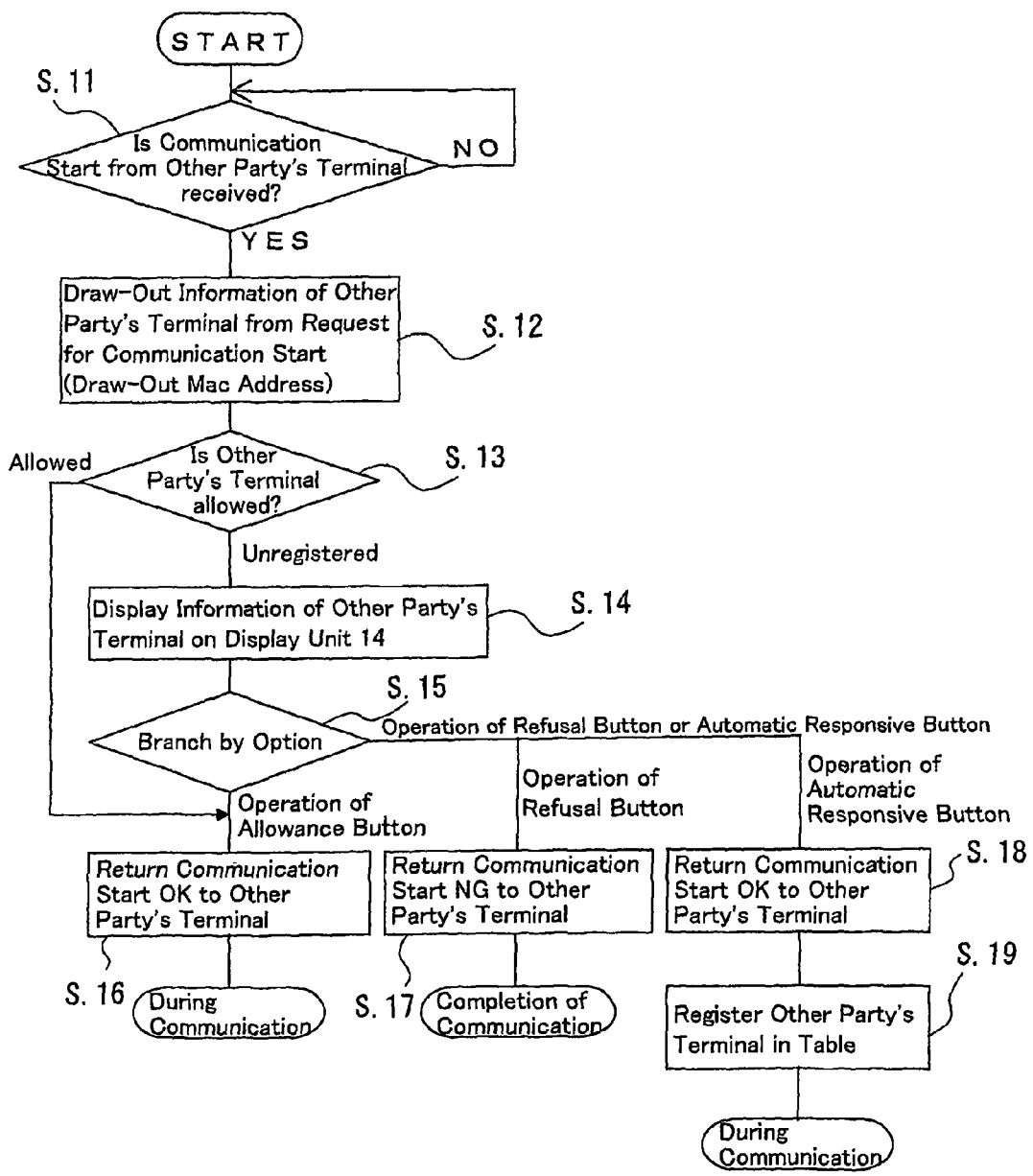
FIG. 16 is an explanatory view of a flow chart in the second embodiment of the present invention.

FIG. 16 illustrates a flow chart for explaining operation of the digital camera 11 according to the second embodiment.

The digital camera 11 is configured to monitor periodically whether the request for communication start exists in a state where a through image is displayed in a photographic mode or a reproduction image is displayed in a reproduced mode (S11).

When receiving the request for communication start from the personal computer 3, the detection device draws out the Mac address of the personal computer 3 which is the transmission source included in the packet of the request for communication start (S12).

The digital camera 11 checks the drawn-out Mac address and the Mac address registered in the table 19 (S13), if the both sides correspond, communication with a client who is the other party is established (S16).

The digital camera 11 checks the drawn-out Mac address and the Mac address registered in the table 19 (S13). If the both sides do not correspond, the digital camera 11 allows the incoming screen G4 to display on the display unit 14 (S14), as shown in FIG. 15.

The digital camera 11 is configured to standby until one of the allowance button 27, the refusal button 28 and the automatic responsive button 20 is operated (S15). If the allowance button 27 is operated, the above-identified responsive packet to communication start is transmitted to the personal computer 3 (S16). Thereby, communication is established between the personal computer 3 and the digital camera 11. On the contrary, if the refusal button 28 is operated, the digital camera 11 is configured to return the communication refusal packet to the personal computer to refuse the communication between the digital camera 11 and the client (S17).

If the allowance button 27 or the refusal button 28 is operated, the Mac address of the terminal of the other party is not registered.

For example, if a client is a personal computer A and the personal computer A is already registered in the table 19, in other words, if a checking result of the drawn-out Mac address and the Mac address registered in the table 19 corresponds, the step S16 is executed to establish the communication between the personal computer A and the digital camera 11.

If the personal computer A is not registered in the table 19 and the allowance button 27 is operated, the step S16 is executed to establish the communication between the personal computer A and the digital camera 11.

If the refusal button 28 is operated, the step S17 is executed. If the automatic responsive button 20 is operated, the Mac address in the personal computer A is registered in the table 19 and the communication between the personal computer A and the digital camera 11 is established (S18, S19).

As information inherent in an instrument which is registered in and controlled based on the table 19, information or terminal name included in the request packet for communication start as shown in FIG. 5A other than the Mac address may be used.

There is also a method for setting the information inherent in the instrument in the camera side. For example, a password inherent in the instrument is set by use of a manufacturer's serial number of the digital camera 11 and the Mac address of the terminal of the other party, which is drawn-out from the request for communication start. The set password is transmitted to the terminal of the other party in addition to the responsive packet to the communication start as shown in FIG. 5B.

The terminal of the other party draws out the inherent password in the instrument included in the responsive packet to communication start and stores it. Thereafter, the terminal of the other party transmits, when the request packet for communication start is transmitted to the digital camera 11, the stored instrument inherent password in addition to the request packet for communication start to the digital camera.

The digital camera 11 draws out the instrument inherent password and the Mac address in the terminal of the other party from the request packet for communication start and prepares instrument inherent information from the manufacturer's serial number of the digital camera, and the prepared information checks with the drawn-out instrument inherent password, thereby the determination about whether the terminal of the other party is allowed in communication is performed.

That is to say, if the checking result corresponds, because the communication between the terminal of the other party and the digital camera 11 is allowed, shifting to communication establishment steps (S18, S19) is possible. If the checking result does not correspond, because connection with the terminal of the other party which has transmitted the request packet for communication start is not allowed, the communication incoming screen G4 as shown in FIG. 15 is displayed on the display unit 14.

In this way, if the instrument inherent password is prepared based on the manufacturer's serial number of the digital camera itself and the information such as the Mac address or name of the terminal which identifies the terminal of the other party, it is not necessary to have a table which registers the terminal of the other party such as the table 19 in the digital camera 11 side. Instead, it is necessary to have the instrument inherent password in the terminal side of the other party.

Figure 17:
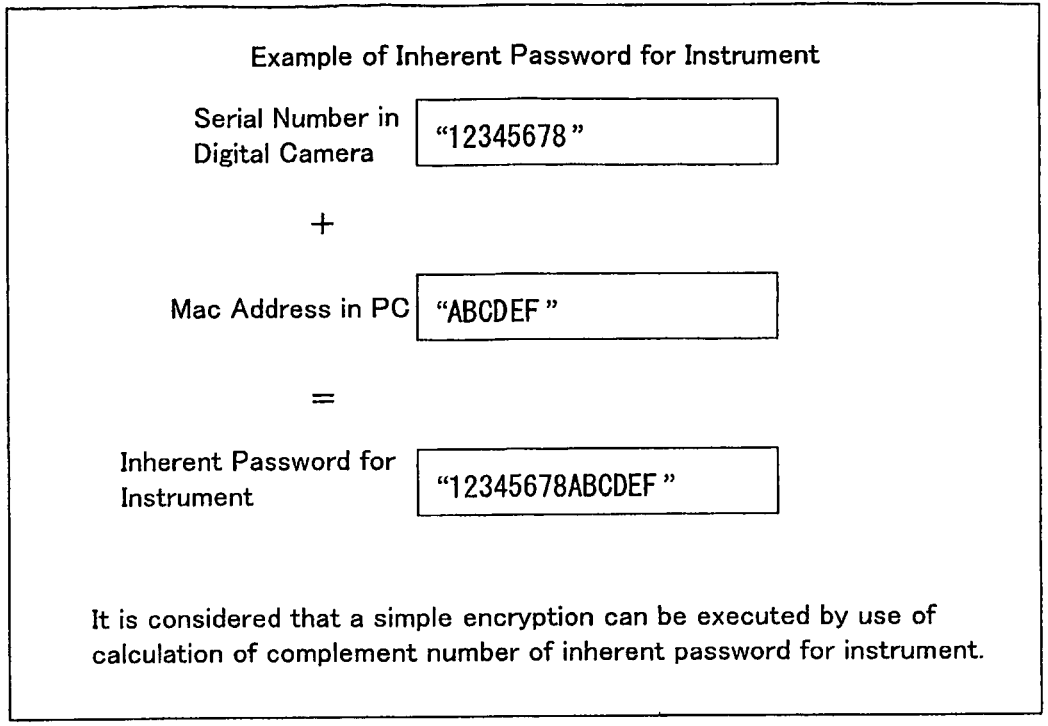
FIG. 17 is an explanatory view showing one example to prepare a password for an inherent instrument in the second embodiment of the present invention.

FIG. 17 illustrates one example of inherent information of instrument. In the instrument inherent information, the serial number in the digital camera is converted into a letter string. The Mac address in the PC side is also converted into a letter string. FIG. 17 illustrates an example in which the serial number of the digital camera is converted into the letter string, "12345678", and the Mac address of the personal computer is converted into the letter string, "ABCDEF".

The instrument inherent information is prepared as a letter string, "12345678ABCDEF" formed by combining the above-mentioned two letter strings simply. Because of an object to identify the personal computer, if it is possible to prepare an instrument inherent password (UUID), any method for preparing the instrument inherent password can be used. Even if the instrument inherent password shown in the above-mentioned one example is sent from other personal computer, because a Mac address in the other personal computer differs from the correctly used Mac address, the received instrument inherent password is not identical with the instrument inherent password prepared at the time of incoming, thereby communication is not established. According to this embodiment, the communication with the personal computer in which connection is allowed once can be always allowed.

With respect to the procedure to release the allowed personal computer, it is possible to structure so that a notice such as a PC release packet is transmitted to the allowed personal computer or the stored instrument inherent password is deleted. It is also possible to respond to the release by adding a version number in preparing the instrument inherent password.

The version number is stored in the non-volatile memory such as the flash ROM. When releasing the allowed personal computer, it is possible to execute the release of the allowed personal computer by updating the version number. Because the prepared instrument inherent password is changed depending on the update of the version number, the changed password differs from the instrument inherent password stored in the allowed personal computer in content, and therefore it is recognized that the allowed personal computer is not allowed. This is applied to all the personal computers.

If the request for communication start is received through a router from an outside network, whether a terminal of the other party is allowed is not determined, and the communication incoming screen G4 is always displayed by skipping the step S13 as shown in FIG. 16. This is because the Mac address of the other party is rewritten into a Mac address of the router, the terminal of the other party cannot be identified.

In addition, the IP address from the outer net work through the router differs from the IP address of the inside net work which does pass through the router in net work portion of the IP address. Therefore, whether the request for communication start passes through the router is determined by checking the net work portion of the IP address included in the request for communication start.

Next, a third embodiment of the image photographic apparatus according to the present invention is described.

In the third embodiment, the image photographic apparatus includes a display unit 14 having a communication incoming screen G5.

Figure 18:
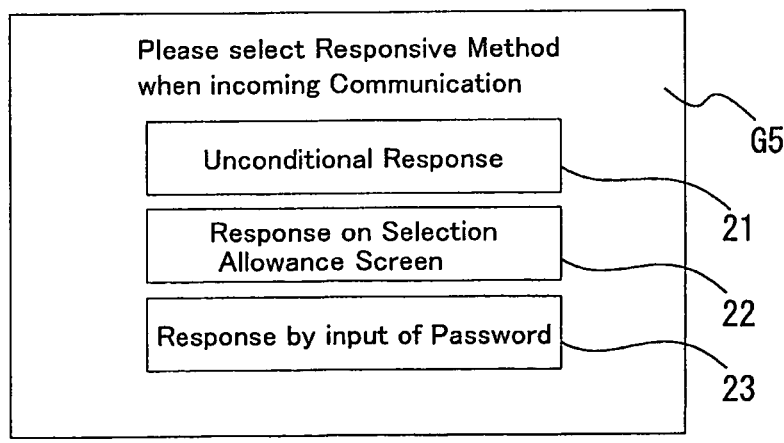
FIG. 18 is an explanatory view of an image photographic apparatus according to a third embodiment of the present invention, in which still another example of the selection input screen displayed on the display unit shown in FIG. 2 is shown.

The communication incoming screen G5 is displayed with an unconditional responsive button 21 to determine whether to allow communication to a client which is the other party unconditionally, a selection input setting button 22 which has an allowance button 27 to allow a request for communication start of the client with the display of the client who transmits the request for communication start and a refusal button 28 to refuse the request for communication start of the client, and a password input button 23, as shown in FIG. 18.

When the unconditional responsive button 21 is operated, communication with a terminal of the other party is established unconditionally. When the password input button 23 is operated, communication with a terminal of the client who is the other party is established if an input password is checked and the checking result is correct. When the selection input setting button 22 is operated, a selection input screen G1 is displayed on the display unit 14. In the selection input screen G1, when the allowance button 27 is operated, communication with the client who is the other party is established, when the refusal button 28 is operated, communication with the client who is the other party is refused.

According to the present invention, with the above-mentioned structure, it is possible to accomplish secure security capable of allowing or refusing the request for communication start from the personal computer or printer which is the client, in the image photographic apparatus which is the server.

Although the preferred embodiments of the present invention have been mentioned, it should be noted that the present invention is not limited to these embodiments, various modifications and changes can be made to the embodiments.

INDUSTRIAL APPLICABILITY

Although the present invention is applied to the image photographic apparatus, the present invention can be applied to an electronic or communication instrument such as a mobile phone or the like.

The invention claimed is:

1. An image photographic apparatus, comprising:
   an information recording medium configured to record an image of a subject;
   a detection device configured to detect a request for communication start including an instrument inherent password and a Mac address of a client, which is transmitted from the client connected to a network;
   a selection-input device configured to select and input whether allowing communication to the client transmitting the request for communication start;
   a transmitting device configured to transmit the image of the subject stored in the information recording medium to the client when the communication to the client is allowed by the selection-input device;
   a drawing-out device configured to draw out the instrument inherent password and the Mac address of the client transmitting the request for communication start from the detected request for communication start transmitted from the client; and
   an information preparing device configured to prepare instrument inherent information from a manufacturer's serial number of the image photographic apparatus and the drawn-out Mac address,
   wherein the transmitting device is configured to automatically transmit the image of the subject to the client when the prepared instrument inherent information corresponds to the instrument inherent password drawn-out from the request for communication start, and
   wherein a selection input screen is displayed on a display of the image photographic apparatus, the selection input screen containing an automatic responsive button for automatically responding to the request for communication start by storing the Mac address of the client in a table when the automatic responsive button is operated, and the image photographic apparatus automatically responds to a request for communication start from a client which has the Mac address previously stored in the table.

2. The image photographic apparatus according to claim 1, wherein the image photographic apparatus is configured to set the instrument inherent password by using the manufacturer's serial number of the image photographic apparatus and the Mac address drawn out from the request for communication start, and to transmit the set instrument inherent password to the client.

3. The image photographic apparatus according to claim 1, wherein an IP address of a second client which requests for communication start is displayed on a display of the image photographic apparatus.

4. The image photographic apparatus according to claim 1, wherein a name of a second client which requests for communication start is displayed on a display of the image photographic apparatus.

5. The image photographic apparatus according to claim 1, wherein the selection input screen contains an allowance button which allows communication with a second client and a refusal button which refuses communication with the second client.

* * * * *